(12) United States Patent
Yamada et al.

(10) Patent No.: US 7,112,278 B2
(45) Date of Patent: Sep. 26, 2006

(54) FUEL FILTER HAVING DOUBLE LAYER STRUCTURE

(75) Inventors: Katsuhisa Yamada, Okazaki (JP); Kouji Izutani, Nagoya (JP)

(73) Assignee: Denso Corporation, (JP)

( * ) Notice: Subject to any disclaimer, the term of this patent is extended or adjusted under 35 U.S.C. 154(b) by 28 days.

(21) Appl. No.: 10/759,069

(22) Filed: Jan. 20, 2004

(65) Prior Publication Data

US 2004/0144705 A1    Jul. 29, 2004

(30) Foreign Application Priority Data

| Jan. 21, 2003 | (JP) | 2003-011987 |
| Jan. 21, 2003 | (JP) | 2003-011993 |
| Nov. 25, 2003 | (JP) | 2003-394143 |
| Nov. 25, 2003 | (JP) | 2003-394155 |

(51) Int. Cl.
B01D 35/027 (2006.01)
B01D 29/13 (2006.01)
B01D 29/58 (2006.01)
F02M 37/22 (2006.01)

(52) U.S. Cl. ............... 210/232; 210/416.4; 210/460; 210/489

(58) Field of Classification Search ........... 210/232, 210/416.1, 416.4, 459, 460, 488, 489
See application file for complete search history.

(56) References Cited

U.S. PATENT DOCUMENTS

| 3,483,398 | A | * | 12/1969 | Hazzard | 210/232 |
| 4,161,422 | A | * | 7/1979 | Lawson et al. | 162/135 |
| 4,312,753 | A | * | 1/1982 | Bell | 210/250 |
| 5,049,271 | A | * | 9/1991 | Cain | 210/250 |
| 5,085,773 | A | * | 2/1992 | Danowski | 210/446 |
| 5,120,434 | A | * | 6/1992 | Yoshida | 210/172 |
| 5,395,520 | A |   | 3/1995 | Ito et al. | |
| 5,547,568 | A | * | 8/1996 | Sasaki | 210/172 |
| 5,582,729 | A | * | 12/1996 | Shioda et al. | 210/461 |
| 5,795,468 | A | * | 8/1998 | Reising et al. | 210/172 |
| 6,080,311 | A | * | 6/2000 | Martin et al. | 210/493.2 |
| 6,216,734 | B1 |  | 4/2001 | Umetsu et al. | |
| 6,471,863 | B1 | * | 10/2002 | Kojima | 210/416.4 |
| 6,830,687 | B1 | * | 12/2004 | Dockery et al. | 210/416.4 |
| 6,833,070 | B1 | * | 12/2004 | Fischer et al. | 210/232 |
| 2003/0132156 | A1 | * | 7/2003 | Rickle | 210/416.4 |
| 2004/0000516 | A1 | * | 1/2004 | Okabe et al. | 210/416.4 |

FOREIGN PATENT DOCUMENTS

JP    20028418    1/2002

* cited by examiner

*Primary Examiner*—Fred G. Prince
(74) *Attorney, Agent, or Firm*—Nixon & Vanderhye PC

(57) ABSTRACT

Fuel passes through a fuel filter from the outer layer of the fuel filter toward the inner layer of the fuel filter. Large debris is arrested in the outer layer made of nonwoven fabric, and small debris is arrested in the inner layer made of filter paper, so that plugging is prevented. The fuel filter is inserted between a fuel pump and a sub-tank. The fuel pump is supported by the fuel filter via both a suction pipe and a fixing section. Vibration generated in the fuel pump is absorbed by the fuel filter which has sufficient thickness, so that the vibration is not transferred to the sub-tank. Thus, filtering performance and lifespan of the fuel filter are easily secured while decreasing vibration transfer.

23 Claims, 13 Drawing Sheets

FUEL FILTER HAVING DOUBLE LAYER STRUCTURE

CROSS REFERENCE TO RELATED APPLICATION

This application is based on Japanese Patent Applications No. 2003-11987 filed on Jan. 21, 2003, No. 2003-11993 filed on Jan. 21, 2003, No. 2003-394143 filed on Nov. 25, 2003 and No. 2003-394155 filed on Nov. 25, 2003 the disclosure of which is incorporated herein by reference.

BACKGROUND OF THE INVENTION

The present invention is related to a fuel filter for removing debris included in fuel.

A fuel filter is used in a pump module received in an in-tank type fuel feed apparatus. A fuel filter according to JP-A-2002-28418 has distribution of filter mesh over the fuel inlet side and fuel outlet side.

Besides, according to JP-A-2000-240723, the pump module receives a fuel supply device supported by a vibration proof member made of a flexible material for mitigating transmission of vibration of the fuel supply device and noise due to generated vibration.

However, width of fibrous material of the filter and a mixing ratio of the material have to be precisely controlled for obtaining a predetermined distribution of the filter mesh. The sizes of pores of the filter have to be formed small on a fine side of the filter for securing filtering performance. Therefore, the filter is apt to be plugged on the fine side, so that pressure loss is increased and lifespan of the filter is decreased. Additionally, it is difficult to control each size of the pores of the filter.

Additionally, if the vibration proof member is provided as an additional part between the fuel supply device and a sub tank receiving the fuel supply device, the number of parts increases and the structure of the pump module becomes complicated.

SUMMARY OF THE INVENTION

In view of the foregoing problems, it is an object of the present invention to propose a filter manufactured by a simple process and having a long lifespan while securing filtering performance. Another object is to propose a filter capable to decrease vibration and noise with a simple structure.

In the present invention, a fuel filter includes a bag-shaped filter body. The filter body is constructed of an outer layer and an inner layer. The outer layer is made of nonwoven fabric. The inner layer is made of filter paper, and connected to the outer layer. The inner layer forms an inside layer of the filter body to remove debris included in fuel. Fuel passes through the filter body from the outer layer toward the inner layer. The filter body includes a connector that connects with an external device.

The fuel filter is provided on a fuel suction side of a fuel supply device. The fuel filter includes a filter body for removing debris included in fuel, and a suction pipe section. The suction pipe section is provided between the filter body and the fuel supply device. Fuel passes from the filter body toward the suction pipe section. The mounting unit secures the fuel supply device to the filter body.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
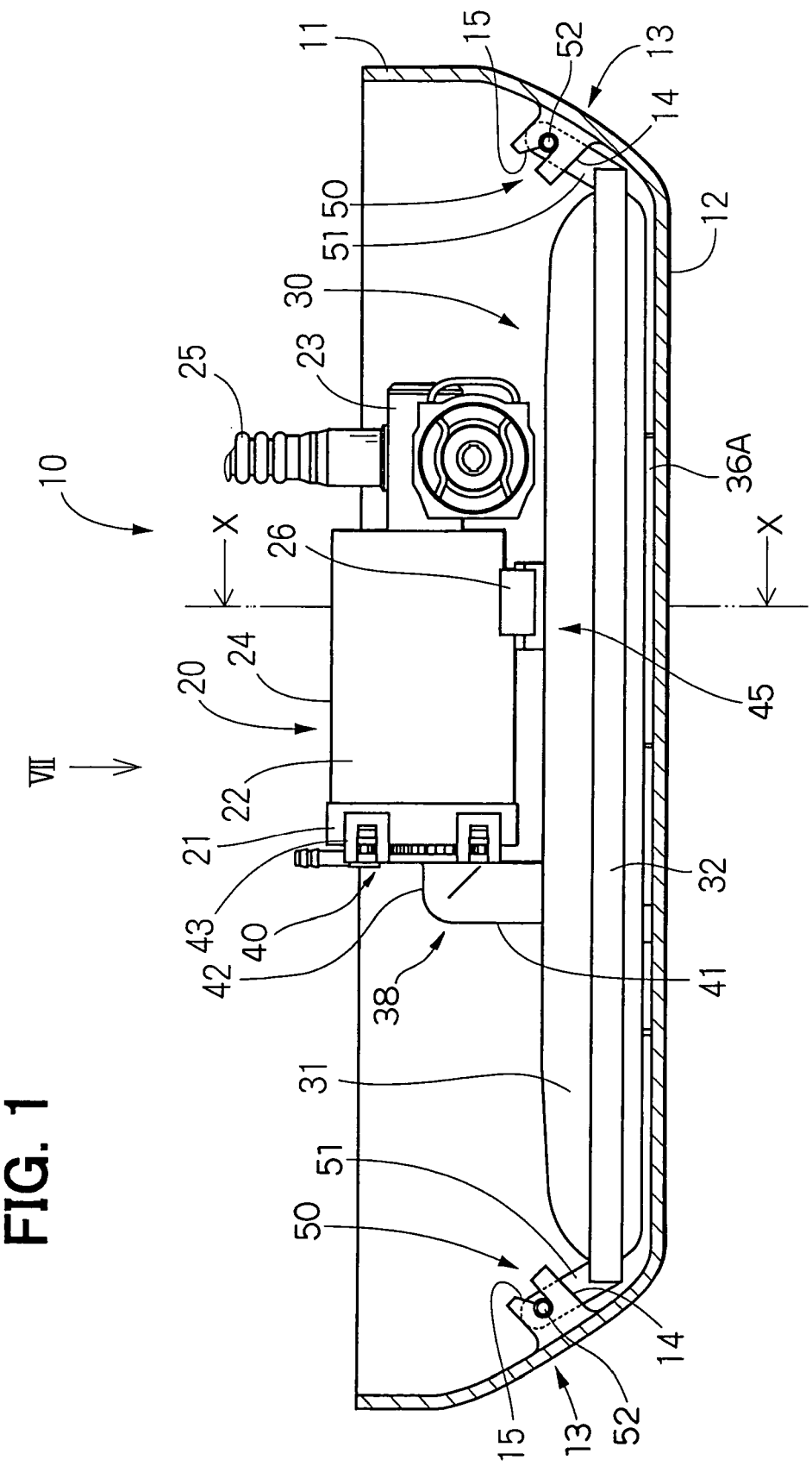
FIG. 1 is a schematic side view showing a pump module including a fuel filter according to the first embodiment of the present invention.

As shown in FIG. 1, a pump module 10 (fuel feed apparatus) includes a fuel pump 20, a sub-tank 11, and a fuel filter 30. The pump module 10 is received in a fuel tank (not shown). The fuel pump 20 (fuel supply device) is arranged in the sub-tank 11, and the axis of the fuel pump 20 is set to be substantially in parallel with the bottom base wall 12 of the sub-tank 11. The fuel pump 20 has a cap 21, a fuel pump body 22 and a fuel outlet section 23. The cap 21 is connected with the fuel filter 30. The fuel pump body 22 includes a motor (not shown) and a housing body 24 which receives an impeller. Fuel is drawn from the cap 21, and pressurized in the fuel pump body 22. The fuel outlet section 23 discharges the fuel pressurized in the fuel pump body 22. A discharge pipe 25 is connected with the fuel outlet section 23 on one end, and is connected with a device, such as an engine, disposed outside of the fuel tank (not shown) on the other end. A filter can be provided at the discharge side of the fuel pump 20 for removing debris included in fuel discharged by the fuel pump 20. The cap 21 constructs a part of the fuel pump 20, and partially receives an internal device, such as an impeller received by the housing body 24 of the fuel pump 20. The cap 21, the housing body 24 and the fuel outlet section 23 are integrally molded of resin, so that a housing is formed. The sub-tank 11 is formed in a bottomed box-shape, and is made of metal or resin. The sub-tank 11 receives the fuel pump 20 and the fuel filter 30.

Figure 2:
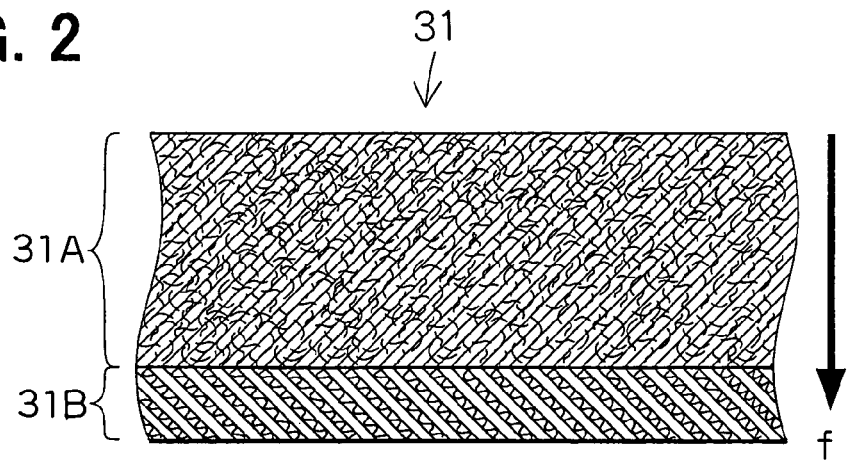
FIG. 2 is a cross-sectional view showing a filter body of the fuel filter.

The fuel filter 30 includes a filter body 31, a mold section 32, a connecting member 40, and a fixing section 45 (mounting unit). As shown in FIG. 2, the filter body 31 includes an outer layer 31A made of nonwoven fabric and an inner layer 31B made of a filter paper. The filter body 31 is formed in a bag-shape, so that the outer layer 31A is positioned on the outer side (i.e., upstream side of fuel flow) and the inner layer 31B is positioned on the inner side (i.e., downstream side of fuel flow). Fuel passes through the filter body 31 from the outer layer 31A toward the inner layer 31B as shown by the arrow f in FIG. 2. The outer layer 31A and the inner layer 31B are stacked without being glued each other. The outer layer 31A is formed thicker than the inner layer 31B.

Size of pores can be easily set in the outer layer 31A by adjusting width of each fibrous material of the nonwoven fabric, a density of the fibrous material of the nonwoven fabric, and thickness of the nonwoven fabric. Besides, sizes of pores of the inner layer 31B can be also easily set by adjusting width of each fibrous material of the paper filter, a density of the fibrous material of the paper filter, and thickness of the paper filter, as well as the outer layer 31A. Pores formed in the nonwoven material are larger than pores formed in the paper filter. Accordingly, relatively large debris included in fuel is removed by the outer layer 31A. Relatively small debris, which is not removed by the outer layer 31A, included in fuel is removed by the inner layer 31B. Therefore, plugging of the inner layer 31B is reduced.

Figure 3A:
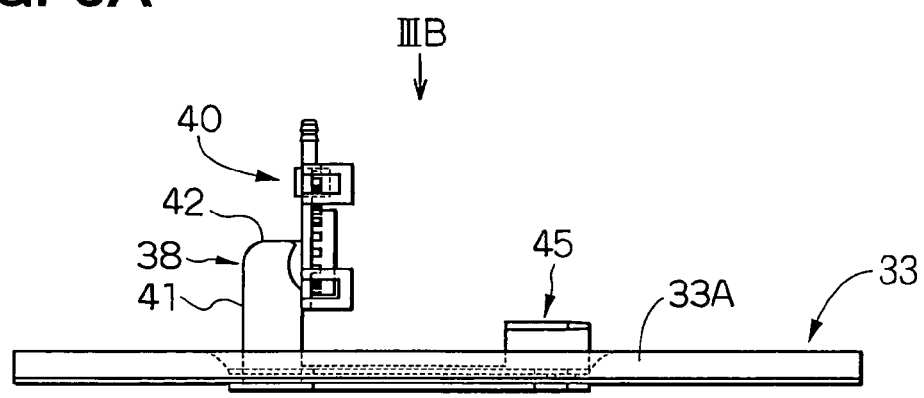
FIG. 3A is a side view showing an upper member for constructing the fuel filter.
Figure 3B:
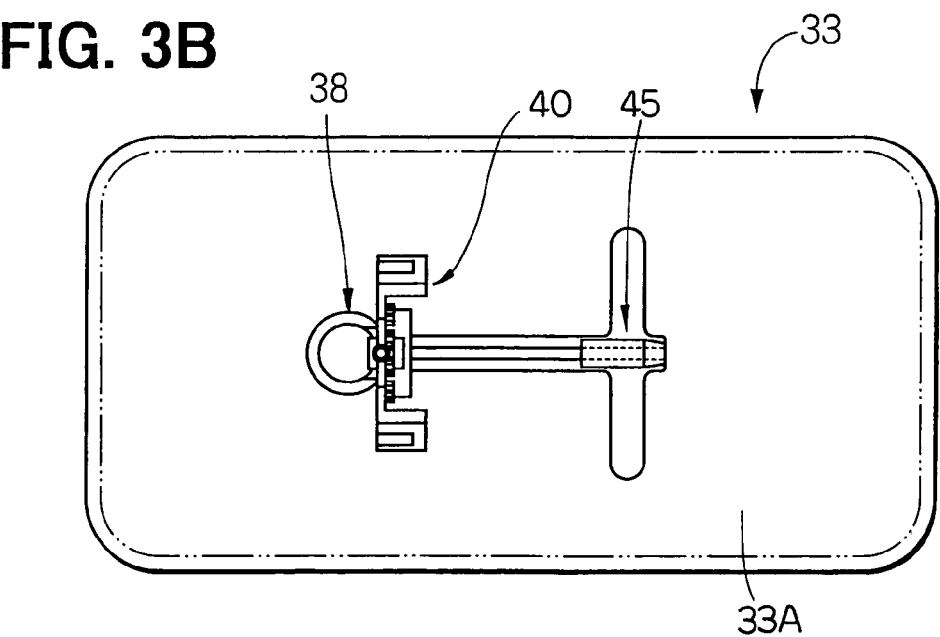
FIG. 3B is a plan view from the arrow B in FIG. 3A.
Figure 4A:
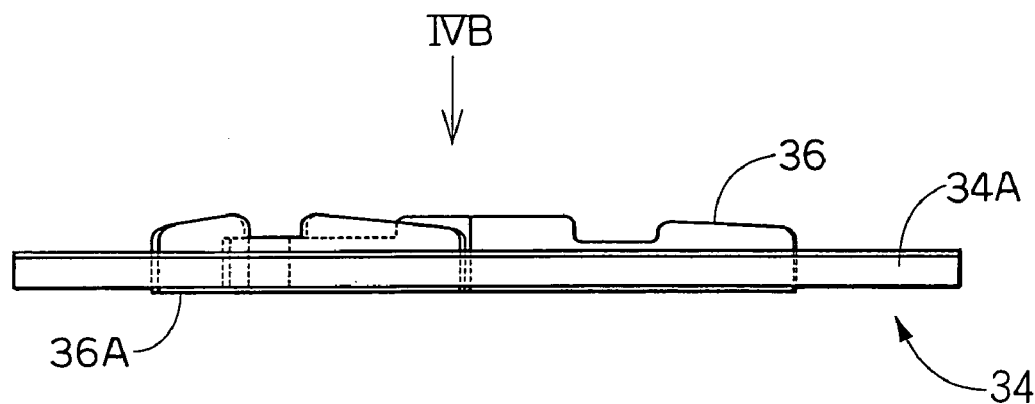
FIG. 4A is a side view showing a lower member for constructing the fuel filter.
Figure 4B:
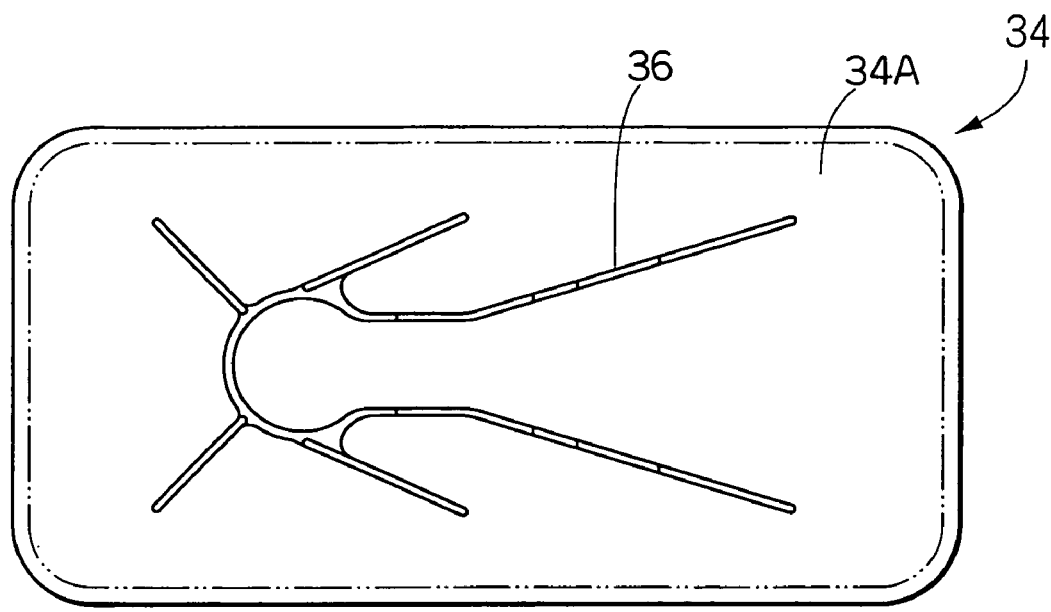
FIG. 4B is a plan view from the arrow B in FIG. 4A.

As shown in FIGS. 2 to 4, the fuel filter 30 is constructed with an upper member 33 and a lower member 34. The upper member 33 has a filter section 33A, and the lower member 34 has a filter section 34A. The filter sections 33A, 34A are constructed into the filter body 31. The upper member 33 has the connecting member 40 in the substantially center of the upper member 33. The connecting member 40 is connected with the cap 21 of the fuel pump 20. The connecting member 40 is made of resin, and formed to penetrate the filter section 33A of the upper member 33. The connecting member 40 has a suction pipe 38 for communicating between the inside of the fuel filter 30 and the cap 21 of the fuel pump 20.

The connecting member 40 is bent by approximately 90 degrees, and has a perpendicular pipe section 41 and a suction pipe section 42. The perpendicular pipe section 41 is connected with the filter body 31, and is arranged approximately perpendicular to the filter body 31. The suction pipe section 42 is connected with the perpendicular pipe section 41, and is substantially in parallel with the filter body 31. As shown in FIG. 1, the suction pipe section 42 is connected with the cap 21 of the fuel pump 20. The central axis of the suction pipe section 42 approximately coincides with the central axis of the fuel pump 20. The connecting section 43 is provided at the end of the suction pipe section 42 on the opposite side with respect to the perpendicular pipe section 41. The connecting section 43 supports the cap 21 of the fuel pump 20.

The cap 21 of the fuel pump 20 fits to the connecting member 40 of the fuel filter 30. As shown in FIG. 3, the connecting member 40 is molded while inserting the filter section 33A of the upper member 33, so that the connecting member 40 and the filter section 33A are sealed. The outer layer 31A is arranged on the plane where the suction pipe 38 is provided. The outer layer 31A faces to the opposite side with respect to the lower member 34, and the inner layer 31B faces to the lower member 34.

As shown in FIG. 4, the lower member 34 has a frame member 36 in the approximately center of the lower member 34.

Figure 6:
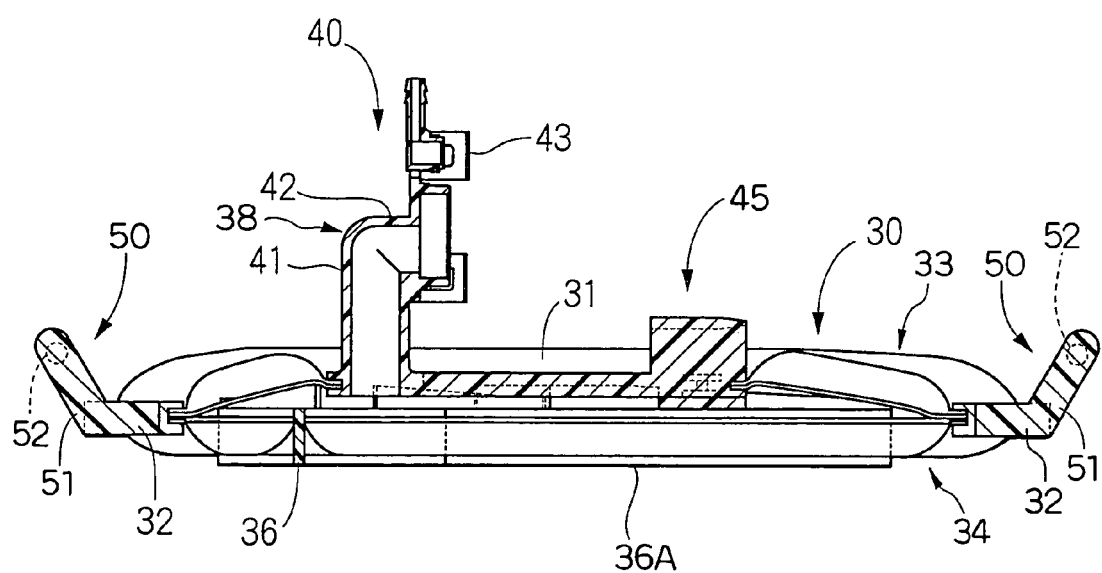
FIG. 6 is a cross-sectional view taken along the line VI—VI in FIG. 5B.
Figure 7:
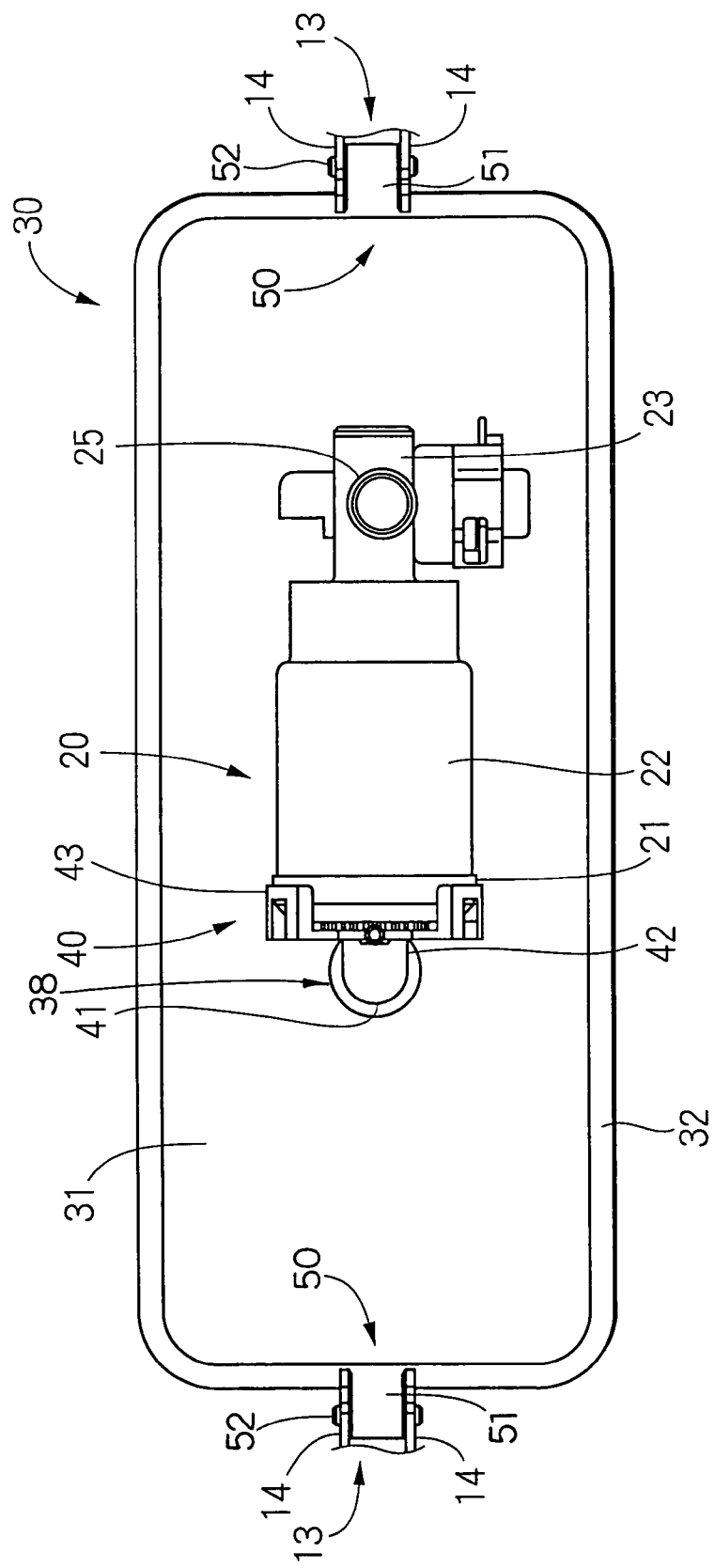
FIG. 7 is a plan view from the arrow VII in FIG. 1.

A frame member 36 is made of resin, and penetrates the filter section 34A of the lower member 34. As shown in FIG. 6, the upper member 33 and the lower member 34 forms a predetermined inner space, so that the frame member 36 maintains that the filter section 33A of the upper member 33 is apart from the filter section 34A of the lower member 34 when fuel is drawn. The frame member 36 is formed to penetrate the filter section 34A of the lower member 34 from the opposite side of the upper member 33, when the bottom section 36A is formed. Therefore, as shown in FIG. 1, a predetermined space is formed between the fuel filter 30 and the inside plane of the base wall 12 of the sub-tank 11. Accordingly, the fuel filter 30 does not closely contact the inside plane of the base wall 12, while keeping filtering area of the fuel filter 30. As shown in FIG. 4, the frame member 36 is molded while inserting the filter section 34A, so that the frame member 36 and the filter section 34A are sealed. The outer layer 31A of the filter section 34A faces to the base wall 12 of the sub-tank 11, and the inner layer 31B of the filter section 34A faces to the upper member 33.

Figure 5A:
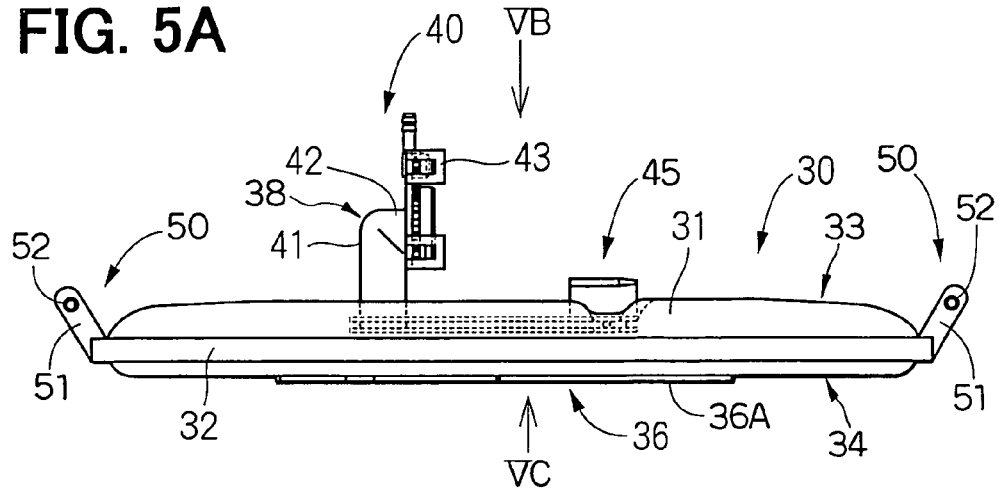
FIG. 5A is a side view showing the fuel filter.
Figure 5B:
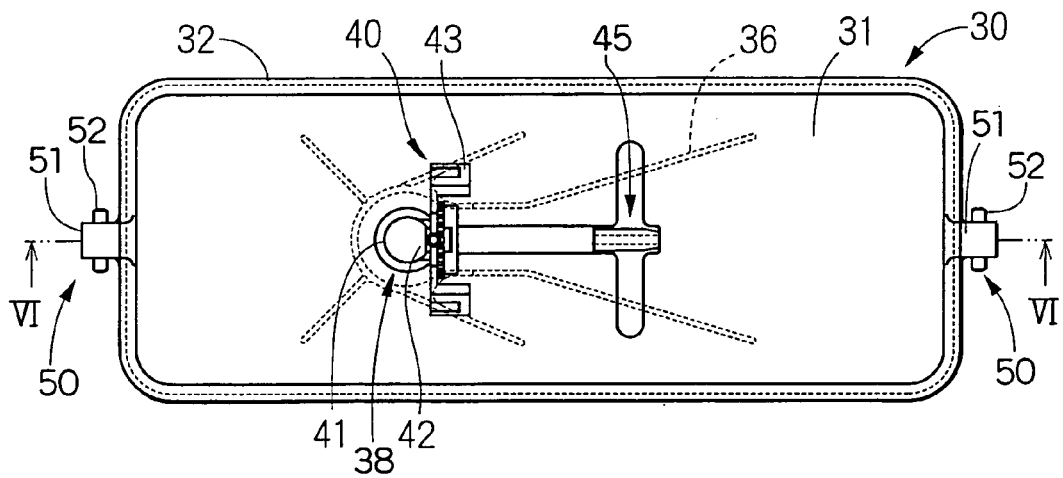
FIG. 5B is a plan view from the arrow B in FIG. 5A.
Figure 5C:
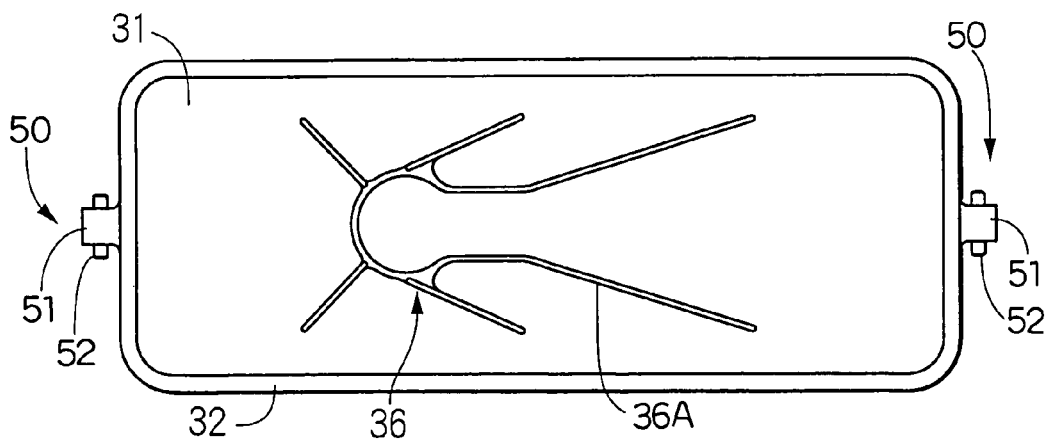
FIG. 5C is a plan view from the arrow C in FIG. 5A.

The frame member 36 is made of resin and formed in a shape shown in FIG. 5, so that the frame member 36 does not interfere with the connecting member 40, which is connected with the filter body 31 and fixing section 45.

As shown in FIG. 6, the periphery of the upper member 33 and the lower member 34 are molded of resin, so that the upper member 33 and the lower member 34 are integrated. Namely, the fuel filter 30 has a resinous mold section 32 on the outer periphery of the filter body 31. In detail, the upper member 33 is stacked on the lower member 34, and the upper member 33 and the lower member 34 are insert-molded, so that the mold section 32 is formed on the periphery of the filter sections 33A, 34A. The mold section 32 integrates the upper member 33 and the lower member 34 into the bag-shaped fuel filter 30, such that the inner layer 31B faces to inside of the fuel filter 30.

The filter body 31 has the inner layer 31B made of filter paper, so that the inner periphery of the filter body 31 is difficult to weld for sealing. However, the mold section 32 is molded on the outer periphery of the filter body 31, while sealing the outer periphery of the inner layer 31B, which is made of filter paper. Thus, the filter body 31 can be sealed at its outer periphery, and the filter body 31 is formed in a bag-shape. Thus, fuel does not intrude into the inside of the filter body 31 from the outer periphery of the filter body 31.

The mold section 32 has the connectors 50. Each connector 50 includes a mounting body 51 and a shaft 52. The mounting body 51 protrudes outside from the mold section 32. The shaft 52 is formed to protrude perpendicularly to the face of the mounting body 51. As shown in FIGS. 1 and 5, the sub-tank 11 has fitting sections 13 formed to protrude toward inside of the sub-tank 11. Each fitting section 13 has a pair of plate sections 14 protruding toward inside of the sub-tank 11. Each plate section 14 has V-shaped notch 15. The shaft 52 of the connector 50 is connected with the notch 15 of the fitting section 13, so that the shaft 52 of the connector 50 fits to the notch 15 of the fitting section 13, and the fuel filter 30 is fixed in the sub-tank 11. The connector 50 is integrally molded with the mold section 32 when the mold section 32 is molded on the outer periphery of the filter body 31.

Conventionally, a suction filter is needed on the suction side of the fuel pump for removing relatively large debris, and a high-pressure filter is needed on the discharge side of the fuel pump for removing relatively small debris.

Figure 8:
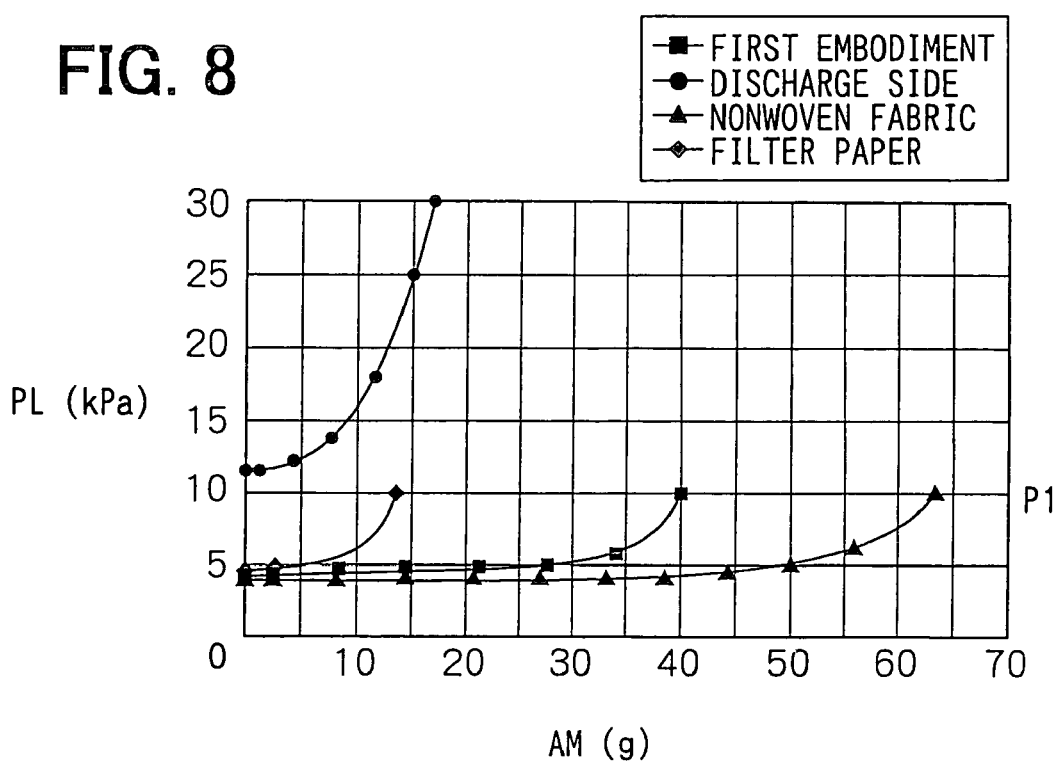
FIG. 8 is a diagram for explaining performance of the fuel filter showing a relationship between an arresting amount AM of debris and a pressure loss PL.
Figure 9:
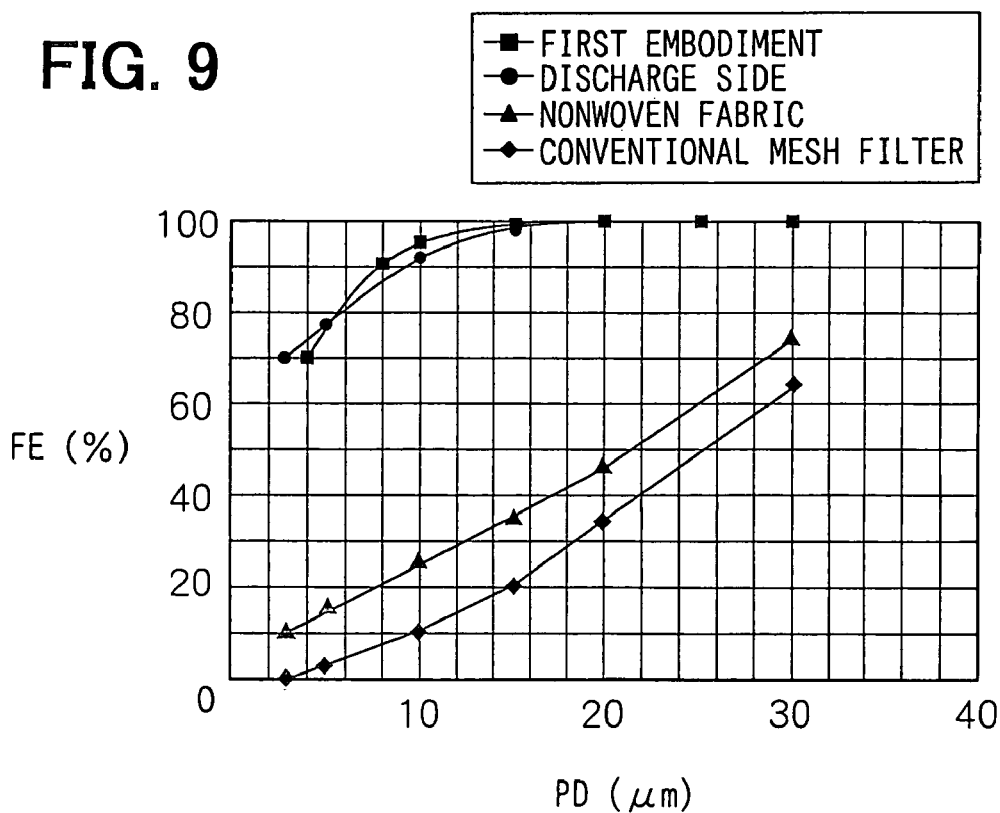
FIG. 9 is a diagram for explaining performance of the fuel filter, showing a relationship between particle size PD of debris and filtering efficiency FE.

Here, an example shown in FIGS. 8 and 9 is in the case that filtering area of the filter is set at 530 cm2 for a single plate.

If a high-pressure filter is provided on the discharge side of the fuel pump 20, as shown by the line (-●-) in FIG. 8, pressure loss becomes large even the arresting amount AM of the debris is 0 g. Because the filter disturbs fuel flow on the discharge side of the fuel pump 20.

If the filter is provided on the suction side of the fuel pump 20, and is constructed with only filter paper, the filter is apt to be plugged because the mesh of filter paper is fine. As shown by the line (-♦-) in FIG. 8, if the filter is constructed with only filter paper, the pressure loss PL reaches at the predetermined value P1 (10 kPa) even the amount AM of arrested debris is small, such as less than 15 g. Accordingly, the lifespan of the filter becomes short. On the other side, if the filter is constructed with only nonwoven fabric, and is provided on the suction side of the fuel pump 20, the amount AM of arrested debris becomes large, such as greater than 60 g as shown by the line (-▲-) in FIG. 8. However, as shown by the line (-▲-) in FIG. 9, filtering efficiency FE of the filter, which is constructed with only nonwoven fabric, is low. Especially if the particle size PD of the debris is small, such as less than 6 μm, filtering efficiency FE becomes less than 20%, because the mesh of the nonwoven fabric is coarse. Therefore, the fuel discharged from the fuel pump 20 includes debris. Accordingly, a fine filter is needed on the fuel discharge side of the fuel pump 20, if the fuel filter is constructed with only nonwoven fabric, and used as the suction filter of the fuel pump 20.

On the contrary, in the first embodiment, the outer layer 31A and the inner layer 31B are stacked to construct the filter body 31. Here, the outer layer 31A is made of nonwoven fabric, and the inner layer 31B is made of filter paper. Therefore, in the first embodiment as shown by the line (-570 -) in FIG. 8, the amount AM of arrested debris is increased until the pressure loss PL reaches at the predetermined pressure P1, comparing with the cases of the high-pressure filter (-●-) and the filter made of filter paper (-♦-). Namely, life span of the filter is increased. Besides, as shown by the line (-■-) in FIG. 9, the filter body 31 in the first embodiment has filtering efficiency greater than 70% with respect to small debris which has diameter less than 5 μm. Additionally, filtering efficiency FE of the filter body 31 in the first embodiment is enhanced up to the similar level as the case of the filter provided on the discharge side of the fuel pump 20 as shown in the line (-●-). On the contrary, as shown by the line (-▲-), the filtering efficiency FE of the filter constructed with only nonwoven fabric is less than 20% with respect to small debris which has diameter less than 6 μm.

Namely, fuel flows from outer layer 31A toward the inner layer 31B over the filter body 31 as shown by the arrow f in FIG. 2. Accordingly, relatively large debris is arrested by the nonwoven fabric constructing the outer layer 31A, and relatively small debris is arrested by the filter paper constructing the inner layer 31B.

In the first embodiment, the outer layer 31A and the inner layer 31B are separately provided, so that nonwoven fabric material and filter paper material can be individually selected for adjusting filtering performance of the filter body 31 based on predetermined filtering performance. Therefore, the filtering performance can be easily adjusted by stacking a specific nonwoven fabric and a specific filter paper. Thus, predetermined filtering performance is secured by simple construction, and life span of the fuel filter 30 can be extended.

In the first embodiment, the outer periphery of the filter body 31 is molded with the mold section 32, so that the filter body 31 is sealed at the outer periphery, and easily formed in the bag-shape even the inner layer 31B is made of filter paper. Therefore, filtering area needed for the fuel filter 30 can be easily secured.

The connector 50 is provided on the mold section 32 for connecting with the sub-tank 11. The resinous mold section 32 is integrally molded with the resinous connector 50 at the same time. Therefore, additional manufacturing process and additional parts are not needed for providing the connector 50.

The filter body 31 has the outer layer 31A and the inner layer 31B, so that relatively large debris and relatively small debris included in fuel can be steadily removed. Accordingly, a fuel filter provided on the discharge side of the fuel pump can be reduced, so that the pump module 10 can be downsized while reducing pressure loss. The fuel filter 30 is provided on the suction side of the fuel pump 20, and is sunk in the fuel. Therefore, even if static electricity is generated in the fuel filter 30, the static electricity is discharged via fuel. The fuel filter is reduced from the discharge side of the fuel pump 20, so that a grounding member is not necessary for discharging static electricity generated in the fuel filter on the discharge side of the fuel pump 20. The fuel filter 30 is provided on the fuel suction side, so that low-pressure fuel flows in the fuel filter 30. Therefore, a reinforcement member, such as additional frame, is not needed for securing strength needed for use in a high-pressure area. Therefore, the structure of the fuel filter 30 and the pump module 10 can be simplified, so that downsizing and manufacturing cost reduction of the pump module 10 can be performed.

The fuel filter 30 can be provided on the fuel tank receiving the pump module 10, instead of providing the fuel filter 30 on the sub-tank 11. A high-pressure fuel filter can be provided on the discharge side of the fuel pump 20 for securing steady filtering performance of the pump module 10.

As shown in FIGS. 1 and 3, the connecting member 40 extends from the filter body 31 toward the upper member 33. Beside, the fixing section (mounting unit) 45 extends from the filter body 31 toward the upper member 33 as well. That is, the fixing section 45 formed on the filter body 31 extends in the same direction as the suction pipe section 42 of the connecting member 40 extends.

Figure 10:
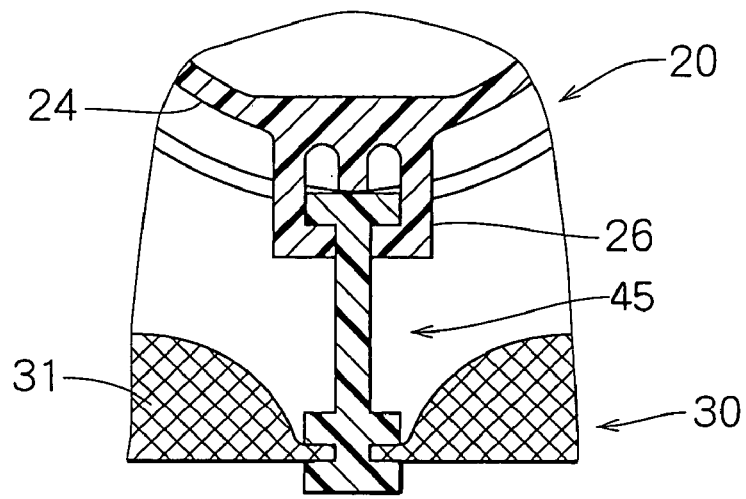
FIG. 10 is an enlarged cross-sectional view taken along the line X—X in FIG. 1, showing a fixing section and an engaging section according to the first embodiment.

As shown in FIG. 10, the fixing section 45 is formed in a T-shape in its cross-section perpendicular to the axial direction of the fixing section 45. The fixing section 45 is provided along the longitudinal direction of the filter body 31. The central axis of the fixing section 45 is substantially parallel with the central axis of the filter body 31. Here, the central axis of the fixing section 45 is parallel with a direction from left to right in FIG. 1.

The central axis of the fuel pump 20 and the central axis of the suction pipe section 42 are located in an approximately same plane. The fixing section 45 is integrally molded with the connecting member 40 (FIG. 3).

An engage section 26 is integrally formed with the housing body 24 of the fuel pump 20 on the filter body 31 side of the fuel pump 20. The engage section 26 is formed to have a cross-sectional shape, which corresponds to the cross-sectional shape of the fixing section 45, in the direction perpendicular to the central axis of the fixing section 45. Namely, the cross-sectional shape of the engage section 26 is formed to surround the outer periphery of the fixing section 45. Therefore, the fixing section 45 and the engage section 26 engage each other.

The engage section 26 is connected with the fixing section 45 on the end of the fixing section 45, which is opposite with respect to the connecting member 40, and the fuel pump 20 is slid toward the connecting member 40 along the central axis of the fixing section 45. The engage section 26 engages with the fixing section 45, so that the fuel pump 20 is mounted on the filter body 31. The fuel pump 20 is further slid toward the connecting member 40, so that the cap 21 of the fuel pump 20 is connected with the suction pipe section 42 of the connecting member 40. The cap 21 is connected with the connecting section 43 of the connecting member 40 by snap-fit or the like.

In the first embodiment, the fuel pump 20 is held by the filter body 31 via the connecting section 40, which has the suction pipe section 42, and the fixing section 45. Therefore, vibration generated by the fuel pump 20 is transmitted to the filter body 31 via the fixing section 45 and the suction pipe section 42. The filter body 31 is constructed with the outer layer 31A and the inner layer 31B, and especially the nonwoven fabric constructing the outer layer 31A has an enough thickness for absorbing noise and vibration. Here, vibration generated in the fuel pump 20 is transferred to the filter body 31 via the connecting section 40 and the fixing section 45, and absorbed by the filter body 31. Therefore, a predetermined filtering performance is obtained, and performance of absorbing vibration and noise is enhanced. The filter body 31 is located between the fuel pump 20 and the sub-tank 11, so that transmission of vibration is decreased from the fuel pump 20 toward the sub-tank 11. Thus, vibration and noise due to vibration can be reduced with a simple structure, which does not need additional part for absorbing vibration. The frame member 36, which supports the filter body 31 from inside of the filter body 31, does not contact the connecting member 40 and the fixing section 45. Here, vibration is transmitted from the fuel pump 20 to the connecting member 40 and the fixing section 45, and absorbed by the filter body 31. However, the vibration generated by the fuel pump 20 is not transmitted to the sub-tank 11 via the frame member 36.

Conventionally, a pump module has a dead space in the upper area of the fuel filter (i.e., the opposite side of the sub-tank with respect to the fuel filter). In the first embodiment, the fixing section 45 is provided on the upper side of the filter body 31 along the longitudinal direction of the filter body 31, so that the dead space formed on the filter body 31 can be efficiently used for the fixing section 45. Thus, the entire pump module 10 can be downsized, so that a space for installing the pump module 10 can be small-sized.

In the first embodiment, the central axis of the suction pipe section 42, the central axis of the fixing section 45, and the central axis of the fuel pump 20 are located in an approximately same plane. Therefore, the fuel pump 20 and the fuel filter 30 are arranged substantially in parallel, so that the height of the pump module is reduced. Thus, an installation space for the pump module 10 is reduced, so that the pump module 10 can be easily installed even when the fuel tank does not have sufficient depth, for example.

In the first embodiment, the fuel pump 20 is slid along its central axis, so that the engage section 26 of the fuel pump 20 engages with the fixing section 45. Therefore, the fuel pump 20 is easily connected with the filter body 31, and steadily held by the fuel filter 30.

The cross-sectional shape of the engage section 26 can be T-shape, and the cross-sectional shape of the fixing section 45 can be a shape corresponding to the T-shape of the engage section 26. Namely, the cross-sectional shape of the engage section 26 and the cross-sectional shape of the fixing section 45 can be replaced each other.

Second Embodiment

Figure 11:
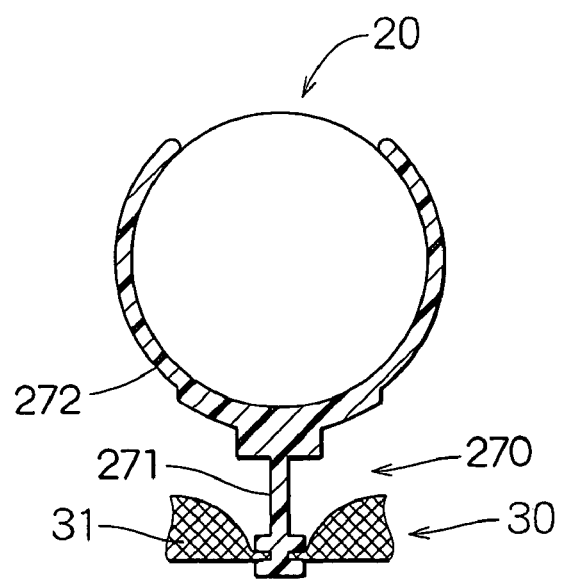
FIG. 11 is an enlarged cross-sectional view showing a fixing member according to the second embodiment of the present invention.

As shown in FIG. 11, a fixing member 270 has a body section 271 and an arm section 272. The body section 271 extends from the filter body 31 toward the suction pipe section 42 connected with the fuel pump 20. The arm section 272 has an arc-shaped cross section which has an inside diameter approximately same as the outer diameter of the fuel pump 20. The arm section 272 extends from a part of the body section 271, which is located on the opposite side with respect to the filter body 30. The arm section 272 can surround the outer periphery of the fuel pump 20 in the circumferential direction of the fuel pump 20, so that the arm section 272 can easily hold the fuel pump 20.

The center of the arc-shaped cross section of the arm section 272 approximately coincides with the central axis of the fuel pump 20 and the central axis of the suction pipe section 42. Therefore, the mounting unit for holding the fuel pump 20 can be downsized, and can be easily formed. The fuel pump 20 is slid into the arm section 272 along the central axis of the fuel pump 20 from the opposite side of the suction pipe section 42 toward the connecting member 40. The fuel pump 20 is inserted into the arm section 272, and is further slid toward the connecting member 40, so that the cap 21 of the fuel pump 20 can be easily connected with the suction pipe section 42 of the connecting member 40. The cap 21 is fixed by the connecting section 43 of the connecting member 40 at the same time. Namely, the inner periphery of the arm section 272 and the fuel pump 20 engage each other in the axial direction of the fuel pump 20.

In the second embodiment, an additional part, such as the engage section 26 in the first embodiment, need not to be formed on the fuel pump 20. Therefore, the design of the fuel pump 20 need not to be modified, so that the fuel pump 20 can be held by the filter body 31 with a simple structure. Vibration and noise are generated by the fuel pump 20, and transmitted to the filter body 31 via the connecting member 40, the arm section 272 and the body section 271 of the fixing member 270. Accordingly, noise and vibration can be absorbed by the filter body 31, and reduced with a simple structure.

The cross-sectional shape of the arm section 272 can be a circular shape instead of the arc shape.

The fuel tank receiving the pump module, and a flange covering an opening of the fuel tank can be connected with the connector provided on the fuel filter. The sub-tank can be reduced, and the fuel filter can be located between the fuel pump and the fuel tank.

The fuel pump (fuel supply device) is not only the device used for pumping fuel in the pump module. The fuel supply device can include a pressure regulator, a high-pressure fuel filter, and a filter case. The pressure regulator controls pressure of the fuel discharged by the fuel pump. The high-pressure fuel filter removes debris included in fuel discharged by the fuel pump. The filter case receives the high-pressure fuel filter.

Third Embodiment

Figure 12:
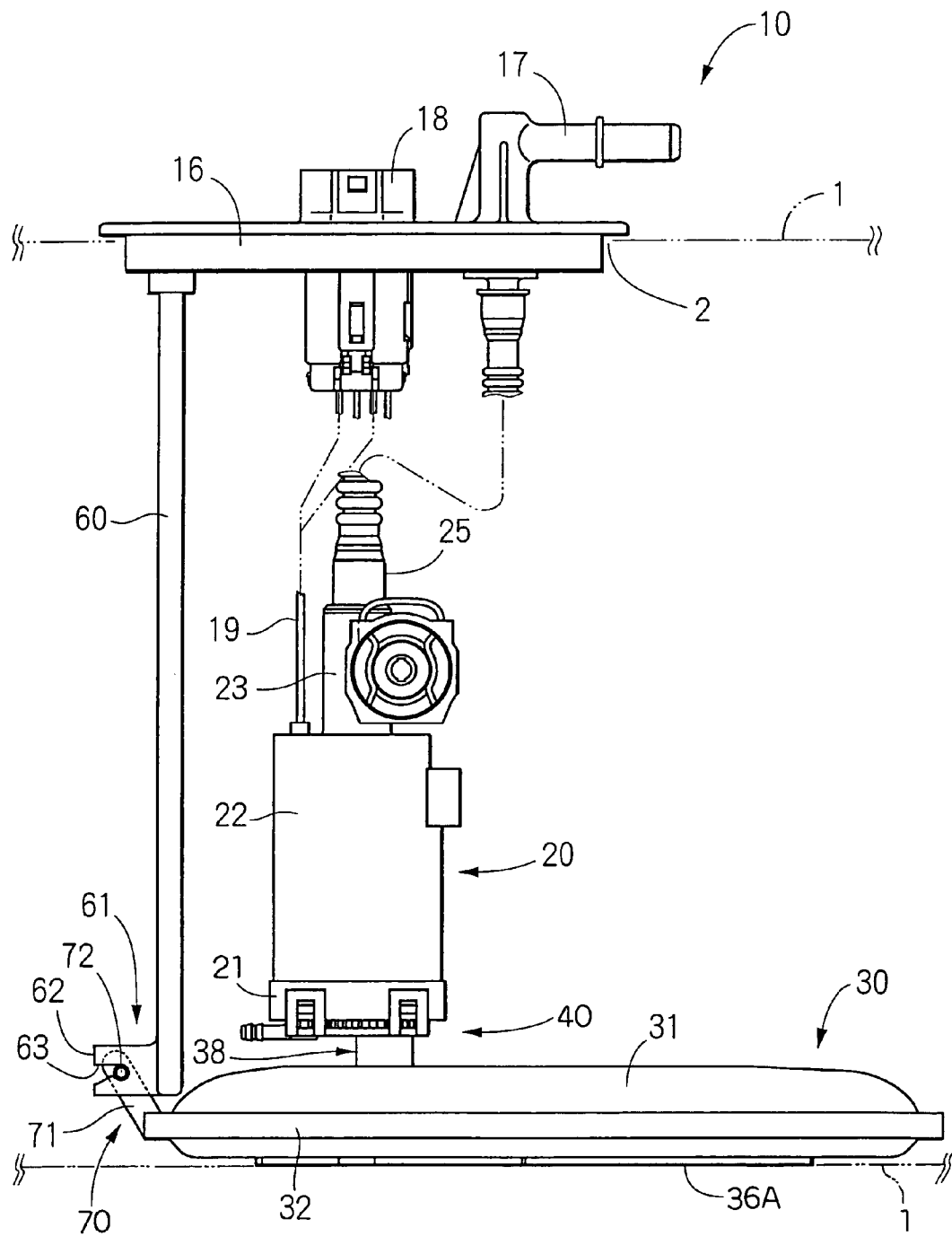
FIG. 12 is a schematic side view showing a pump module including a fuel filter according to the third embodiment of the present invention.

In the third embodiment, as shown in FIG. 12, the fuel pump 20 is vertically installed in the pump module 10, so that the longitudinal direction of the fuel filter 30 (i.e., the filter body 31) is substantially perpendicular to the axis of the fuel pump 20 (i.e., the fuel pump body 22).

The pump module 10 includes a flange 16 and a connecting member 60, in addition to the fuel pump 20 and the fuel filter 30. The flange 16 is formed in an approximately disc-shape, and covers an opening 2 formed on the top end plane of the fuel tank 1. The sub-tank 10 is not shown in FIG. 12, however the sub-tank 10 can be added to the pump module 10 for receiving the fuel pump 20 and the fuel filter 30. A fuel discharge port 17 and a connector 18 are provided on the flange 16. The fuel discharge port 17 is connected with an engine (not shown), for example. Fuel is discharged from the fuel outlet section 23 of the fuel pump 20, and transferred to the fuel discharge port 17 through a discharge pipe 25. The connector 18 is connected with an electric power supply (not shown) via an ECU (not shown). The connector 18 is also connected with a motor (not shown) accommodated in the fuel pump body 22 received in the fuel tank 1 via lead wires 19.

The electric power supply supplies electric power to the motor of the fuel pump body 22 via the ECU, the connector 18, and the lead wires 19. The connecting member 60 extends from the flange 16 toward the bottom of the fuel tank 1.

The connecting member 40 is formed on the fuel filter 30, and connected with the cap 21 of the fuel pump 20. The suction pipe 38 of the connecting member 40 is formed perpendicularly to the fuel filter 30. The fuel filter 30 is arranged in parallel with the bottom base wall of the fuel tank 1. The fuel filter 30 includes the filter body 31 and the mold section 32. The filter body 31 in the third embodiment has the outer layer 31A and the inner layer 31B as same as the filter body 31 in the first embodiment. The mold section 32 is formed on the outer periphery of the filter body 31.

A connector 70 is provided on the mold section 32. The connector 70 includes a mounting body 71 protruding outside of the mold section 32, and a shaft 72 perpendicularly formed with respect to the mounting body 71. Besides, a fitting section 61 is provided on the connecting member 60, and outwardly protrudes with respect to the fuel filter 30. The fitting section 61 has a pair of plate sections 62. Each of the plate sections 62 has a v-shaped notch 63. The pair of plate sections 62 are arranged in parallel each other, and outwardly protrude from the connecting member 60 in the diametrical direction of the flange 16. The shaft 72 of the connector 70 is connected to the notches 63 of the fitting sections 61, so that the shaft 72 fits to the notches 63. Thus, the fuel filter 30 and the flange 16 are fixed via the connecting member 60. The connector 70 and the mold section 32 are made of resin, and integrally molded when the mold section 32 is formed on the outer periphery of the filter body 31. Accordingly, additional manufacturing process and additional parts are not necessary for connecting the fuel filter 30 and the flange 16.

A mounting member can be additionally formed with the mold section 32 for connecting the fuel filter 30 and the connecting member 60. Additionally, the filter 30 can be connected with a sub-tank or the fuel tank 1 by using the mounting member. In this case, components can be connected each other in a simple structure, without increasing the number of the parts.

Fourth Embodiment

Figure 13:
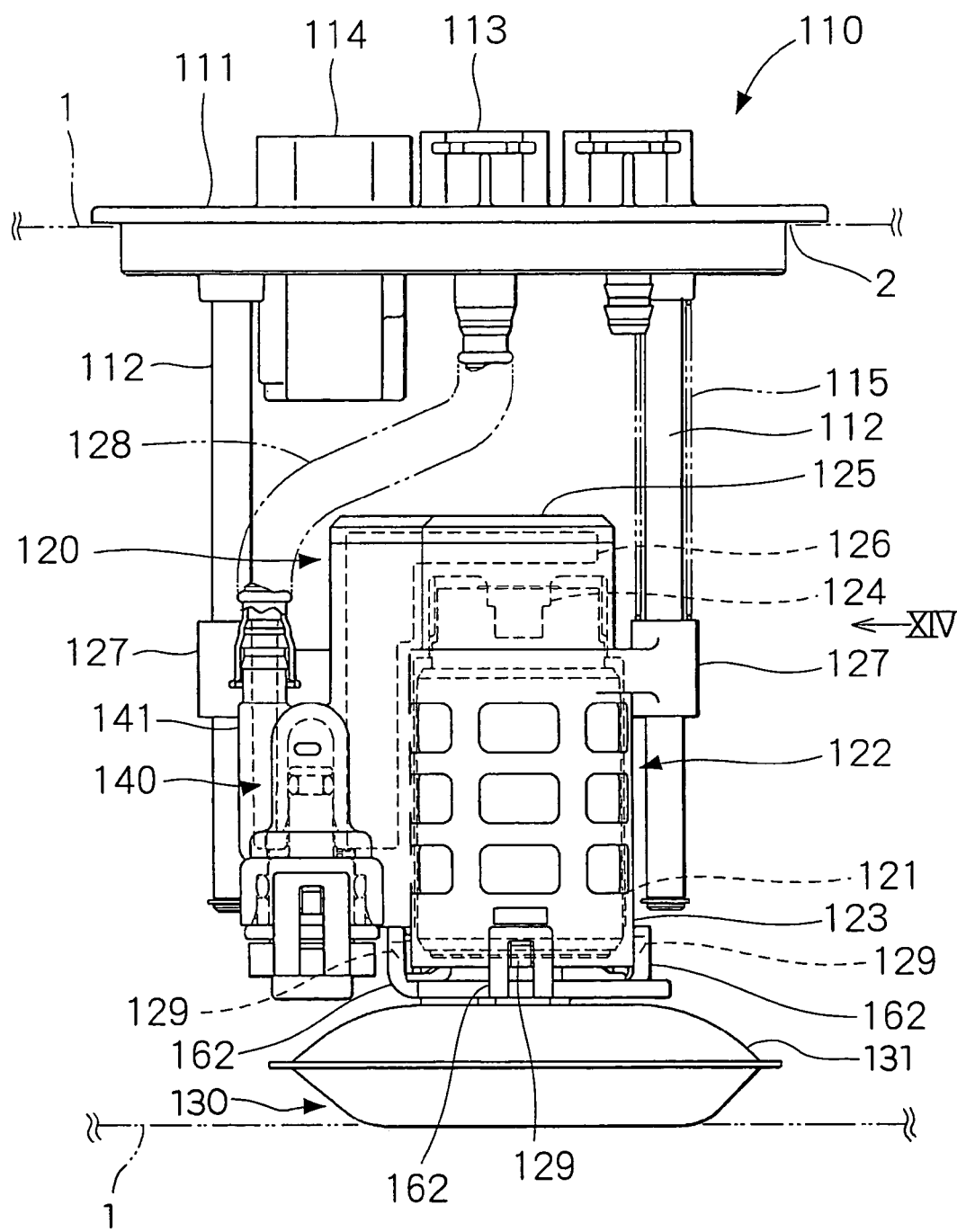
FIG. 13 is a schematic side view showing a pump module including a fuel filter according to the fourth embodiment of the present invention.
Figure 14:
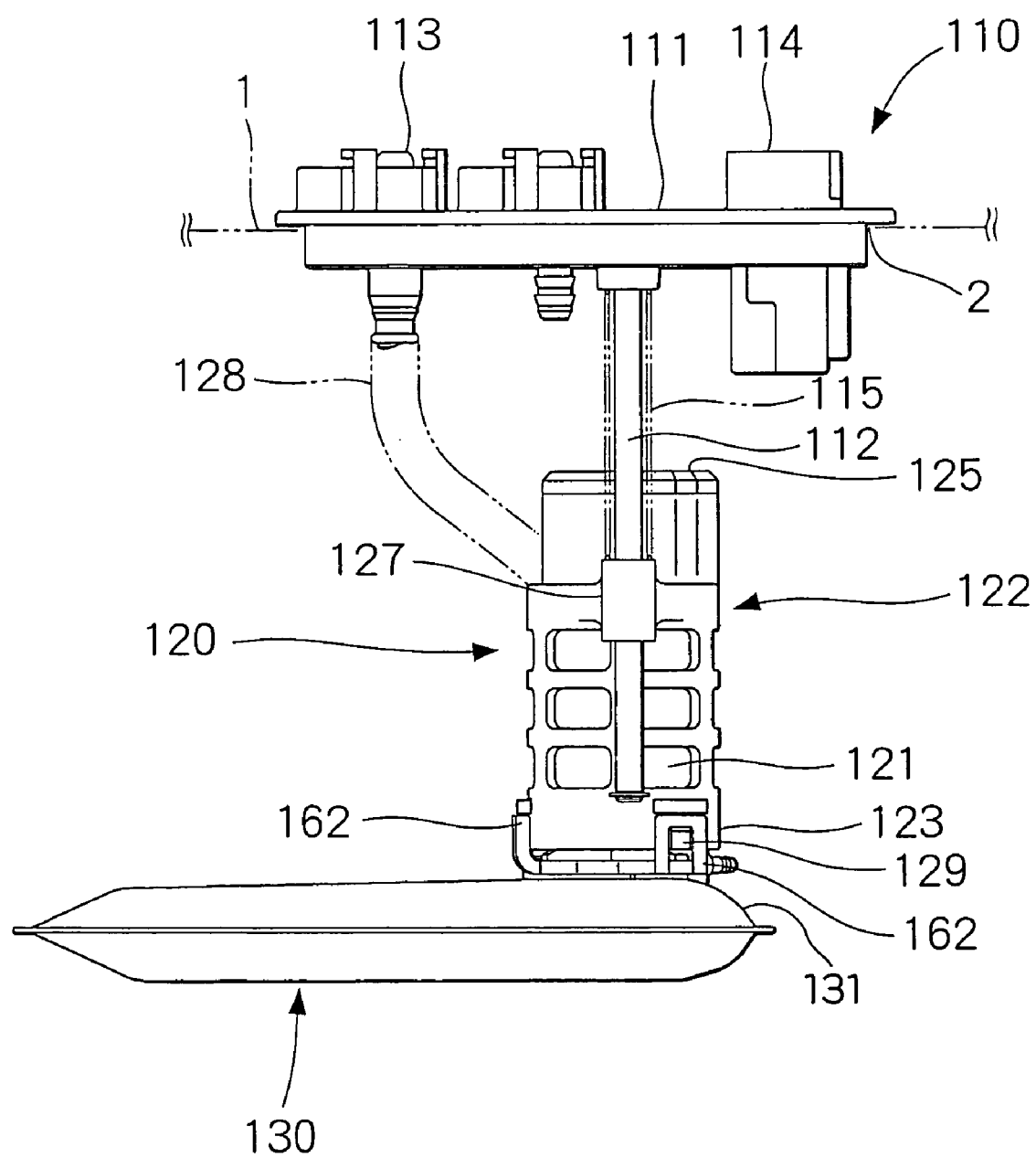
FIG. 14 is a side view from the arrow XIV in FIG. 13.

In the fourth embodiment, as shown in FIGS. 13 and 14, a pump module 110 (fuel feed apparatus) includes a fuel pump 120 (fuel supply device), a fuel filter 130, a flange 111, and a connecting member 112. The fuel pump 120 is provided above the fuel filter 130, and receives a fuel pump body 121. The longitudinal direction of the filter body 131 of the fuel filter 130 is substantially perpendicular to the axis of the fuel pump body 121. The flange 111 is substantially formed in a disc shape for covering an opening 2 formed in the top end plane of the fuel tank 1. A sub-tank is not shown in the pump module 110 shown in FIG. 13, however a sub-tank can be provided in the pump module 110 for receiving the fuel pump 120 and the fuel filter 130. A fuel discharge port 113 and a connector 114 are provided on the flange 111. The fuel discharge port 113 is connected with an engine (not shown), for example. The connector 114 is connected with a power supply (not shown) via an ECU (control unit, not shown). The connector 114 is connected with a motor (not shown) of the fuel pump 120. The power supply supplies the motor of the fuel pump 120 with electricity via the ECU and the connector 114. The fuel pump 120 includes a fuel pump body 121 and a housing 122. The housing 122 is made of resin. The housing 122 has a casing 123 receiving the fuel pump body 121, and a cover 125 provided on the side of the fuel discharge port 124 of the fuel pump body 121. The fuel pump body 121 is covered with the cover 125 on the side of the fuel discharge port 124. The cover 125 is connected with the fuel pump body 121, and forms a fuel discharge passage 126. A cylindrical section 127 is integrally formed with the casing 123 for supporting the connecting member 112. The cylindrical section 127 has an inner diameter slightly larger than the outer diameter of the connecting member 112, so that the cylindrical section 127 can slide with respect to the connecting member 112 along the axial direction of the connecting member 112. A spring 115 is provided around the connecting member 112 as a forcing unit. The spring 115 contacts the flange 111 on one end, and contacts the cylindrical section 127 on the other end, so that the spring 115 forces the flange 111 and the cylindrical section 127 to separate from each other. The volume of the fuel tank 1 varies due to temperature variation and variation of remaining fuel amount in the fuel tank 1. However, the fuel filter 130 of the pump module 110 is pressed onto the bottom plane of the fuel tank 1 by the spring 115, even the distance between the top end of the fuel tank 1 and the bottom end of the fuel tank 1 is changed.

A pressure regulator 140 is integrated with the housing 122 of the fuel pump 120. The pressure regulator 140 is connected with the fuel pump 120 and a fuel discharge port 113 of the flange 111. Fuel is discharged from the fuel pump 120 toward the pressure regulator 140 through the fuel discharge passage 126. The pressure regulator 140 controls pressure of the fuel discharged from the fuel pump 120. The fuel flows out of the pressure regulator 140, and flows toward the fuel discharge port 113 after passing through a discharge pipe section 141 integrated with the housing 122 and a discharge pipe 128 connected with discharge pipe section 141.

The housing 122 has claws 129 (engage section) on the opposite side of the fuel discharge port 124 in the axial direction of the fuel pump 120. The claws 129 outwardly protrudes from the housing 122 in the diametrical direction of the housing 122. The claws 129 are integrally molded with the casing 123 of the housing 122. The claws 129 and fitting sections (mounting unit) 162 of the fuel filter 130 are connected each other, so that The fuel pump 120 and the fuel filter 130 are connected each other. Thus, the fuel filter 130 is located on the opposite side of the fuel discharge section of the housing 122.

Figure 15:
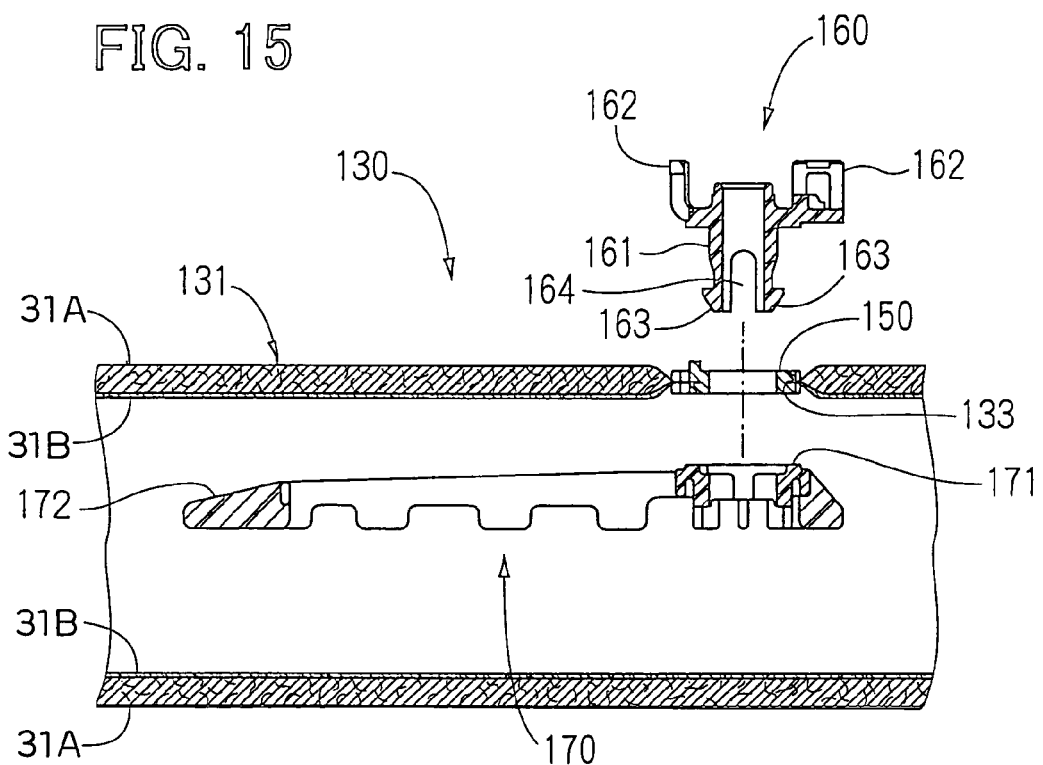
FIG. 15 is a schematic cross-sectional view showing a construction of components of the fuel filter according to the fourth embodiment.

As shown in FIG. 15, the fuel filter 130 has a filter body 131, which includes a first member 150, a second member 160, and a third member 170.

Figure 16:
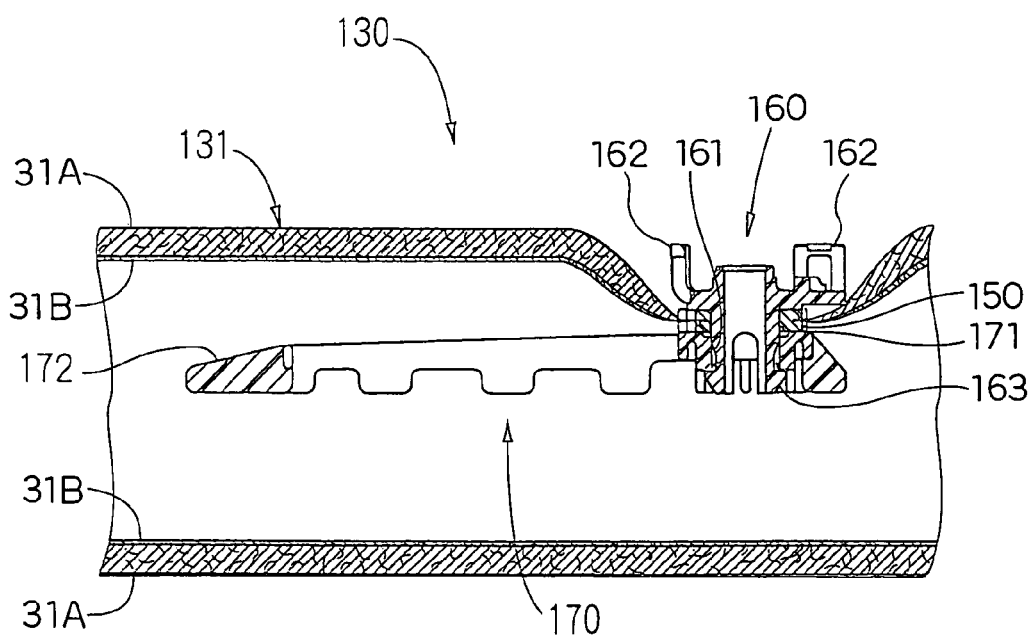
FIG. 16 is a schematic cross-sectional view showing a constructed fuel filter according to the fourth embodiment.

The second member 160 has a suction pipe section 161. The third member 170 has a frame section 172. As shown in FIG. 16, the frame section 172 of the third member 170 is connected with the suction pipe section 161 via the filter body 131. The suction pipe section 161 connects with an inlet section (not shown) of the fuel pump 120. The fitting section 162 integrated with the suction pipe section 161 fits to the claws 129 formed on the housing 122. Thus, the fuel filter 130 is connected with the fuel pump body 121 and the housing 122. The fuel filter 130 has the filter body 131 which has the outer layer 31A and the inner layer 31B as same as the first embodiment.

Figure 17:
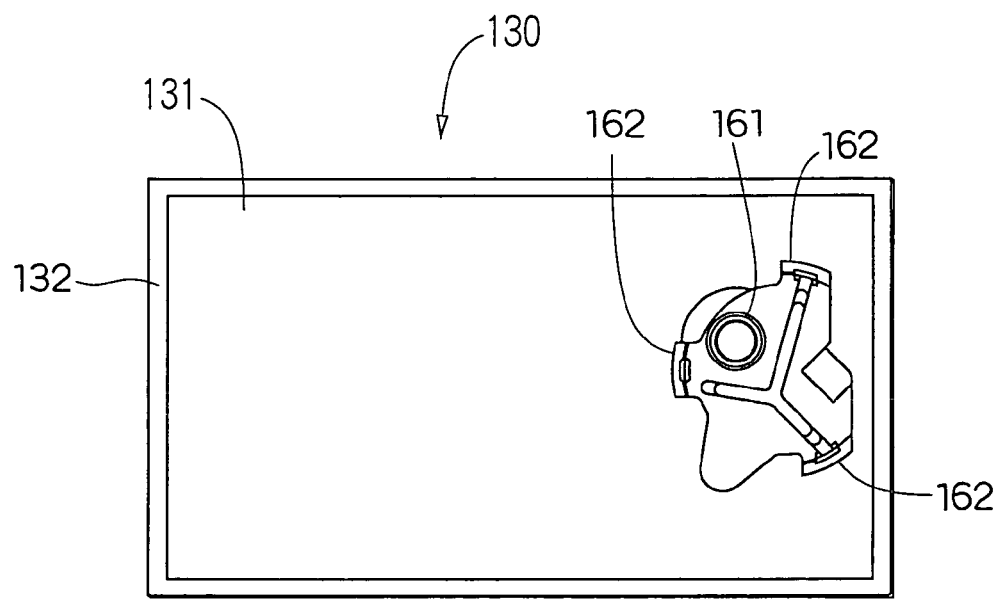
FIG. 17 is a schematic plan view showing the fuel filter according to the fourth embodiment.

As shown in FIG. 17, the peripheral section 132 of the filter body 131 is sealed, so that the filter body 131 is formed in a bag-shape. Namely, all brims of the rectangular peripheral section 132 of the filter body 131 is welded and sealed, using ultrasonic welding or vibration welding, for example. Especially, in the fourth embodiment, the fuel filter 130 is provided only in the fuel inlet port of the fuel pump 120, and any fuel filter is not provided on the fuel discharge port 124 side of the fuel pump body 121. Therefore, large filtering area is needed to the fuel filter 130 for securing a filtering performance and a lifespan, so that thickness of the fuel filter 130 increases. Accordingly, energy of ultrasonic welding may be insufficient, and vibration welding is more effective.

The outer layer 31A and the inner layer 31B are stacked without being welded, and constructed to be the filter body 131. The outer layer 31A is made of nonwoven fabric, and the inner layer 31B is made of filter paper. The filter body 131 is formed in a bag-shape, so that fuel passes through the nonwoven fabric in the outer layer 31A and the filter paper in the inner layer 31B. The fuel is drawn into the fuel pump 120 from the suction pipe section 161, after passing the filter body 131.

The filter paper constructing the inner layer 31B contains resinous filer, pulp, and inorganic fiber. The resin fiber is heated and melted when the peripheral section 132 of the filter body 131 is welded. Subsequently, the resin fiber is cooled and solidified when the peripheral section 132 of the filter body 131 is sealed. Besides, the resin fiber needs to be resistive to fuel, because the resin fiber filters debris included in fuel. Additionally, the resin fiber needs to be formed in a fibrous shape. Accordingly, in the fourth embodiment, polyester fiber is used for the resin fiber. However, the resin fiber is not limited to the polyester fiber. Oil-resisting resin, such as polyamide fiber, can be used for the resin fiber. On the other hand, pulp is a necessary component for filtering function. The pulp fiber connects each other by hydrogen bonding, so that strength of the filter is secured while forming minute mesh needed for arresting debris. The filter constructing the inner layer 31B includes resin fiber at least 18% and at maximum 80% by weight.

The peripheral section 132 is welded and sealed so that the filter body 131 is formed in a bag-shape. Therefore, sufficient bonding strength needs to be secured on the periphery section 132 of the filter body 131. As the resin fiber content increases in the filter body 131, the amount of melting resin increases in the filter body 131, so that welding can be easily performed. Thus, bonding strength is enhanced in the welding section. The nonwoven fabric is made of resin fiber for example, so that the nonwoven fabric can be easily welded. However, the filter paper is mainly made of pulp, so that it is difficult to perform welding. Accordingly, resin fiber is needed in the filter paper for welding work.

Figure 18:
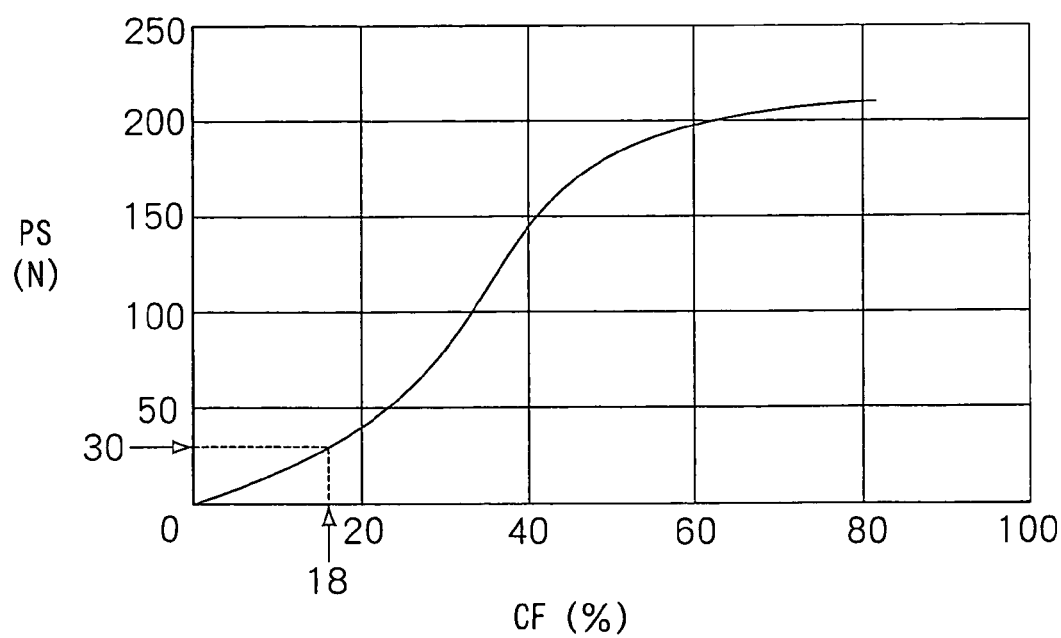
FIG. 18 is a diagram for explaining a relationship between content rate CF of resin fiber and peel strength PS of the fuel filter, according to the fourth embodiment.

As shown in FIG. 18, as the resin fiber content CF decreases in the filter body 131, the welding work becomes difficult on the peripheral section 132 of the filter body 131, so that peel strength PS becomes low. The peripheral section 132 of the filter body 131 is easily peeled, if the peel strength is lower than 30N. Accordingly, fuel may flow into the inside of the filter 131 without passing the outer layer 31A and the inner layer 31B. Therefore, the lower limit of the resin fiber content CF is predetermined at 18%.

As the resin fiber content CF increases, welding of the filter body 131 can be easily performed, so that peel strength PS of the filter body 131 increases. However, pulp is necessary as binding fiber to form papery filter using resin fiber material. Accordingly, it is not preferable to decrease pulp content due to excessive use of the resin fiber. Additionally, as pulp content decreases, hydrogen bonding strength decreases among pulp fiber material, so that papery filter becomes hard to form. Accordingly, the amount of binder increases for securing strength of the filter, and mesh size for arresting debris becomes small, so that it becomes difficult to maintain arresting performance of debris. Therefore, the upper limit of resin fiber content is predetermined at 80%.

In the fourth embodiment, the filter paper, which forms the inner layer 31B of the filter body 131, includes resin fiber. Accordingly, the peripheral section 132 of the filter body 131 can be welded when the filter body 131 is formed in a bag-shape. Besides, resin fiber content of the filter body 131 is predetermined between 18% and 80%. Therefore, both strength of the welded filter body 131 and arresting performance of debris can be secured.

The filter body 131 in the fourth embodiment can be used in the pump module shown in the first embodiment, the second embodiment, and the third embodiment.

As shown in FIG. 15, the filter body 131 has an approximately circular opening section 133 for connecting both inside of the bag-shaped filter body 131 and the outside of the bag-shaped filter body 131 with the fuel pump (fuel feed apparatus) 120. The first member 150 is provided around the opening section 133 of the filter body 131. The first member 150 is made of resin, and is molded while inserting the filter body 131, so that the filter body 131 is inserted by the first member 150. Therefore, the filter body 131 does not need any other opening in addition to the opening 133. On the contrary, in the first embodiment shown in FIG. 6, plural openings are needed to be penetrating the filter body 31 for forming the connector 50 if the mold section 32 is not formed. Because, resin cannot pass through the filter body 31, so that passages are needed for supplying resin to inside of the filter body 31 (i.e., inner layer 31B). In the fourth embodiment shown in FIG. 15, additional opening is not needed to the filter body 131, so that the filter body 131 can be easily manufactured when the fuel filter 130 is formed.

The second member 160 has the suction pipe section 161, which extends in its axial direction. The second member 160 has plural fitting sections 162 (mounting unit). The fitting sections 162 are outwardly provided on the suction pipe 161 in the diametrical direction of the suction pipe 161, and arranged in the circumferential direction of the second member 160. The fitting sections 162 can fit to the claws 129, which are formed on the housing 122 of the fuel pump 120. The claws 129 are arranged in the peripheral direction of the housing 122, so that the claws 129 correspond to the fitting sections 162. The fitting sections 162 are formed to protrude from the suction pipe section 161 toward the opposite direction with respect to the filter body 131 side. Thus, the fuel pump body 121 of the fuel pump 120 is received in the inner peripheries of the fitting sections 162. An inlet port (not shown) of the fuel pump body 121 is connected with the suction pipe section 161, and inserted inside of the suction pipe section 161. The fitting section 162 is connected with the claws 129, so that the fuel pump 120 is connected with the filter body 131. Here, the suction pipe section 161 can be inserted into the inlet port of the fuel pump body 121.

The second member 160 can be inserted by the inner periphery of the first member 150. The second member 160 has projecting section 163 (fitting section) on the end of the suction pipe section 161, which is on the opposite side with respect to the fitting sections 162 of the second member 160. The projecting section 163 outwardly protrudes in the diametrical direction of the section pipe member 161. The second member 160 has a slit 164 in the suction pipe section 161, so that the diameter of the section pipe 161 can expand and contract. The outer diameter of the projecting section 163 is larger than the inner diameter of the first member 150. However, the outer diameter of the suction pipe section 161 can expand and contract, so that the second member 160 can be easily inserted by the inner periphery of the first member 150. The suction pipe section 161 has a portion, which does not have the slit, and the portion has a diameter larger than the inner diameter of the first member 150. Therefore, the portion, which does not have the slit, is press-inserted into the first member 150, so that the first member 150 and the second member 160 are fixed each other.

The third member is provided in the filter body 131, and has a receptacle section 171 and the frame section 172. The receptacle section 171 is formed in a cylindrical shape. The inner diameter of the receptacle section 171 is smaller than the outer diameter of the projecting section 163. However, the diameter of the suction pipe section 161 can expand and contract, so that the suction pipe section 161 can be inserted in the receptacle section 171. The projecting section 163 is inserted in the receptacle section 171, and is slid toward the opposite side with respect to the first member 150. Subsequently, the outer diameter of the protruding section 161 increases, and the protruding section 161 can be hooked on the end of the receptacle section 171 on the opposite side of the first member 150. The frame section 172 of the third member 170 supports the filter body 131 from inside of the filter body 131. Namely, the third member 170 supports the inner side of the filter body 131. Therefore, the filter body 131 is protected from differential pressure, which is generated by suction of fuel. Thus, deformation of the filter body 131 is prevented while securing the filtering area of the filter body 131.

Initially, the filter body 131 of the fuel filter 130 is formed in a rectangular-shaped sheet, which has the opening 133. The first member 150 is insert-molded at the opening 133. The second member 160 is press-inserted into the first member 150 from the outer layer 31A side of the filter body 131 toward the inner layer 31B side. The third member 170 is located on the inner layer 31B side of the filter body 131. As shown in FIG. 16, the second member 160 is inserted by the inner periphery of the first member 150, and is inserted in the receptacle section 171 of the third member 170. Namely, the first member 150, which is provided to the filter body 131, is put between the second member 160 and the third member 170.

The projecting section 163 of the second member 160 is inserted into the receptacle section 171 of the third member 170, and is located on the opposite side of the filter body 131 with respect to the receptacle section 171. The projecting section 163 outwardly expands in the diametrical direction of the suction pipe section 161 by resilience. The projecting section 163 is hooked on the end of the receptacle section 171, which is on the opposite side with respect to the filter body 131. Thus, the first member 150 is put between the second member 160 and the third member 170, while the second member 160 fits to the third member 170 while inserting the first member 150. Thus, the filter body 131, to which the first member 150 is provided, and the second member 160 and the third member 170 are integrally constructed.

The filter body 131, the first member 150, the second member 160, and the third member 170 are constructed, and combined with a flat-shaped lower section of the filter body 131, which has the outer section 31A and the inner section 31B. The peripheral section 132 of the filter body 131 is bonded by using vibration welding or ultrasonic welding. Thus, the fuel filter 130, which has the bag-shaped filter body 131, is formed. The formed fuel filter 130 is connected with the fuel pump 120. The fuel pump body 121 of the fuel pump 120 is received in the housing 122. The fuel inlet port of the fuel pump body 121 is inserted into the suction pipe section 161, and the claws 129 fits to the fitting sections 162. Thus, the fuel filter 130 and the fuel pump 120 are integrally connected each other. The integrated fuel pump 120 and the fuel filter 30 are connected with the flange 111, or the like, so that construction of the pump module 110 is completed.

In the fourth embodiment, the first member 150 is provided around the opening 133 of the filter body 131. In detail, the filter body 131 is inserted by the first member 150, such that the first member 150 is formed around the opening 133 of the filter body 131. Therefore, a resin material does not have to pass through the filter body 131 for forming the first member 150, when the filter body 131 and the first member 150 are insert-molded. Thus, holes need not to be formed on the filter body 131, except for the opening 133. Accordingly, manufacturing process for the filter body 131 can be reduced, and the filter body 131 and the first member 150 can be easily manufactured.

The filter body 131 and the fuel pump body 121 of the fuel pump 120 are substantially perpendicularly arranged each other. Therefore, the cross-sectional area of the pump module 110 can be reduced with respect to the axial direction of the pump module 110. Here, the axial direction of the pump module 110 is the vertical direction in FIG. 13. Besides, the cross-sectional area of the pump module 110 corresponds to the opening 2 formed in the top plane of the fuel tank 1 for inserting the pump module 110 into the fuel tank 1. The cross-sectional area of the pump module 110 is reduced, so that the area of the opening 2 can be reduced. Thus, the strength reduction of the fuel tank 1 can be prevented, and the sealing length between the flange 111 and the fuel tank 1 can be reduced.

The second member 160 fits to the third member 170 while inserting the first member 150, so that the fuel filter 130 is manufactured. The fuel filter 130 is connected with the fuel pump 120, so that the pump module 110 is manufactured. Therefore, both the fuel filter 130 and the pump module 110 are easily manufactured by a simple process, such as fitting. The peripheral section 132 of the filter body 131 is welded, so that the filter body 131 is sealed at the peripheral section 132. Thus, the fuel filter can be easily manufactured comparing with molding the peripheral section 132 of the filter body 131.

The first member 150 and the second member 160 can be integrally formed. Besides, the first member 150 and the third member 170 can be integrally formed. The number of the parts can be reduced by integrally forming plural members. The periphery of the filter body 131 can be molded of resin. In this case, a connector can be provided on a mold section formed on the outer periphery of the filter body 131.

The structure of the devices of the pump module 10, 110 is not limited to the structures mentioned in the above structures. The fuel filter can support components, such as the fuel pump, the housing, the high-pressure filter, the pressure regulator, a jet pump, and a module constructed with such devices. The components can be a single device, or a single module, or a combination of the devise and the module. A high-pressure filter can be provided on the fuel discharge side of the fuel pump for removing debris included in fuel.

The pump module in the above embodiments includes the fuel filter which has the outer layer 31A and the inner layer 31B, so that relatively large debris and small debris included in fuel can be removed at the inlet of the fuel pump 20. Therefore, debris included in fuel can be steadily removed without increasing pressure loss.

The filter body and the mounting unit in the above embodiments can be integrally formed.

Other various changes and modifications are to be understood as being within the scope of the present invention as defined by the appended claims.

What is claimed is:

1. A fuel filter comprising a bag-shaped filter body that includes: an outer layer that is made of nonwoven fabric; and an inner layer that is made of filter paper and is connected to the outer layer and forms an inside layer of the filter body to remove debris included in fuel, wherein fuel passes through the filter body from the outer layer toward the inner layer,
    further comprising a mold section that is molded of resin, wherein the mold section is provided on an outer periphery of the filter body,
    wherein the mold section includes at least one connector to which an external device is connectable.

2. A fuel feed apparatus, comprising the fuel filter according to claim 1 on a fuel suction side of the fuel feed apparatus.

3. A fuel filter and external device, comprising a bag-shaped filter body that includes: an outer layer that is made of nonwoven fabric; and an inner layer that is made of filter paper and is connected to the outer layer and forms an inside layer of the filter body to remove debris included in fuel, wherein fuel passes through the filter body from the outer layer toward the inner layer,
    further comprising at least one connector, to which an external device is connectable,
    wherein the external device is a sub-tank which receives the filter body.

4. A fuel filter and external device, comprising a bag-shaped filter body that includes: an outer layer that is made of nonwoven fabric; and an inner layer that is made of filter paper and is connected to the outer layer and forms an inside layer of the filter body to remove debris included in fuel, wherein fuel passes through the filter body from the outer layer toward the inner layer,
    further comprising at least one connector, to which an external device is connectable,
    wherein the external device is a flange which covers an opening of a fuel tank which receives the filter body.

5. A fuel filter comprising a bag-shaped filter body that includes: an outer layer that is made of nonwoven fabric; and an inner layer that is made of filter paper and is connected to the outer layer and forms an inside layer of the filter body to remove debris included in fuel, wherein fuel passes through the filter body from the outer layer toward the inner layer,
    wherein the filter paper of the inner layer includes resin fiber, pulp and non-organic fiber, and a content of the resin fiber is between 18% and 80% by weight in the filter paper.

6. A fuel filter provided on a fuel suction side of a fuel supply device, the fuel filter comprising:
    a filter body that removes debris included in fuel;
    a suction pipe section that connects between the filter body and the fuel supply device to conduct fuel from the filter body to the suction pipe section;
    a mounting unit that secures the fuel supply device to the filter body; and
    a mold section that is molded of resin on an outer periphery of the filter body,
    wherein the mounting unit is provided along a longitudinal direction of the filter body, and
    wherein the mold section includes at least one connector to which an external device is connectable.

7. The fuel filter according to claim 6, wherein: the mounting unit extends from the filter body toward the fuel supply device, and engages an engage section of the fuel supply device.

8. The fuel filter according to claim 7, wherein the mounting unit and the engage section engage with each other in an axial direction of the fuel supply device.

9. The fuel filter according to claim 6, wherein, the filter body and the mounting unit are integrally formed.

10. The fuel filter according to claim 6, wherein the filter body and the fuel supply device are received in a fuel tank in which fuel is received.

11. A fuel filter provided on a fuel suction side of a fuel supply device, the fuel filter comprising:
    a filter body that removes debris included in fuel;
    a suction pipe section that connects between the filter body and the fuel supply device to conduct fuel from the filter body to the suction pipe section;
    a mounting unit that secures the fuel supply device to the filter body; and
    a mold section that is molded of resin on an outer periphery of the filter body,
    wherein the filter body includes:
    an outer layer that is made of nonwoven fabric; and
    an inner layer that is made of filter paper and is connected to the outer layer and forms an inside layer of the filter body to remove debris included in fuel, and
    wherein the mold section includes at least one connector to which an external device is connectable.

12. A fuel filter provided on a fuel suction side of a fuel supply device, the fuel filter comprising:
    a filter body that removes debris included in fuel;
    a suction pipe section that connects between the filter body and the fuel supply device to conduct fuel from the filter body to the suction pipe section;
    a mounting unit that secures the fuel supply device to the filter body; and
    a mold section that is molded of resin on an outer periphery of the filter body,
    wherein the mold section includes at least one connector to which an external device is connectable.

13. A fuel filter provided on a fuel suction side of a fuel supply device, the fuel filter comprising:
a filter body that removes debris included in fuel;
a suction pipe section that connects between the filter body and the fuel supply device to conduct fuel from the filter body to the suction pipe section; and
a mounting unit that secures the fuel supply device to the filter body,
wherein the mounting unit is provided along a longitudinal direction of the filter body,
wherein a central axis of the fuel supply device, a central axis of the suction pipe section and a central axis of the mounting unit are all located in a single plane.

14. A fuel filter provided on a fuel suction side of a fuel supply device, the fuel filter comprising:
a filter body that removes debris included in fuel;
a suction pipe section that connects between the filter body and the fuel supply device to conduct fuel from the filter body to the suction pipe section;
a mounting unit that secures the fuel supply device to the filter body; and
an arm section that extends from the filter body toward the fuel supply device, and surrounds an outside of the fuel supply device in a peripheral direction of the fuel supply device.

15. The fuel filter according to claim 14, wherein the arm section has an inner periphery which engages with the fuel supply device in an axial direction of the fuel supply device.

16. A fuel filter provided on a fuel suction side of a fuel supply device, the fuel filter comprising:
a filter body that removes debris included in fuel;
a suction pipe section that connects between the filter body and the fuel supply device to conduct fuel from the filter body to the suction pipe section; and
a mounting unit that secures the fuel supply device to the filter body,
wherein:
the fuel supply device includes a fuel pump body;
the fuel filter is provided on a suction side of the fuel pump body;
a longitudinal direction of the filter body is substantially perpendicular to the central axis of the fuel pump body; and
the mounting unit includes a fitting section, wherein the fitting section is fitted to the outside periphery of and engages with a casing receiving the fuel pump body.

17. The fuel filter according to claim 16, wherein:
the fuel supply device has a housing including the casing for receiving the fuel pump body; and
the housing has a claw which engages with the fitting section.

18. The fuel filter according to claim 16, wherein the casing includes a cylindrical section for receiving and supporting a connecting member.

19. A fuel filter provided on a fuel suction side of a fuel supply device, the fuel filter comprising:
a filter body that removes debris included in fuel;
a suction pipe section that connects between the filter body and the fuel supply device to conduct fuel from the filter body to the suction pipe section;
a mounting unit that secures the fuel supply device to the filter body;
a first member provided around an opening which is formed in the filter body;
a second member that has:
a suction pipe section fitted to an inner periphery of the first member; and
a fitting section, which is provided radially outward of the suction pipe section and is fitted to the outside periphery of a casing receiving the fuel pump body; and
a third member that is connected with the second member via the first member and supports an inner side of the filter body,
wherein:
the fuel supply device includes a fuel pump body;
the fuel filter is provided on a suction side of the fuel pump body; and
a longitudinal direction of the filter body is substantially perpendicular to the central axis of the fuel pump body.

20. The fuel filter according to claim 19, wherein: the second member has a projecting section provided on an end of the suction pipe section which is located on an opposite side with respect to the fitting section; and the projecting section radially outwardly projects and fits to an end of the third member which is arranged on the opposite side with respect to the first member.

21. The fuel filter according to claim 19, wherein, the first member and the second member are integrally formed.

22. The fuel filter according to claim 19, wherein the casing includes a cylindrical section for receiving and supporting a connecting member.

23. A fuel filter provided on a fuel suction side of a fuel supply device, the fuel filter comprising:
a filter body that removes debris included in fuel;
a suction pipe section that connects between the filter body and the fuel supply device to conduct fuel from the filter body to the suction pipe section;
a mounting unit that secures the fuel supply device to the filter body;
wherein:
the fuel supply device includes a fuel pump body;
the fuel filter is provided on a suction side of the fuel pump body; and
a longitudinal direction of the filter body is substantially perpendicular to the central axis of the fuel pump body; and
wherein the filter body includes:
an outer layer that is made of nonwoven fabric; and
an inner layer that is made of filter paper and is connected to the outer layer and forms an inside layer of the filter body to remove debris included in fuel,
wherein the filter paper of the inner layer includes resin fiber, pulp and non-organic fiber, and a content of the resin fiber is between 18% and 80% by weight in the filter paper.

* * * * *